E. W. HANNA.
SELF-LUBRICATING AXLE SPINDLE.
APPLICATION FILED JAN. 31, 1908.
920,736.
Patented May 4, 1909.
2 SHEETS—SHEET 2.
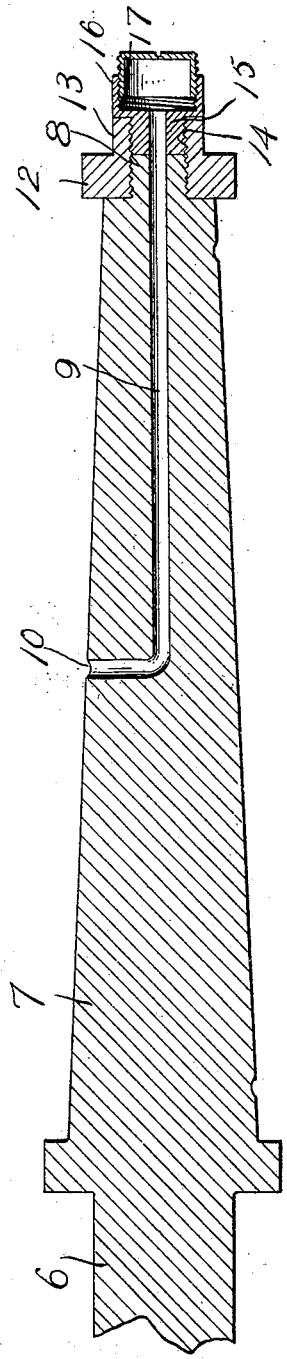
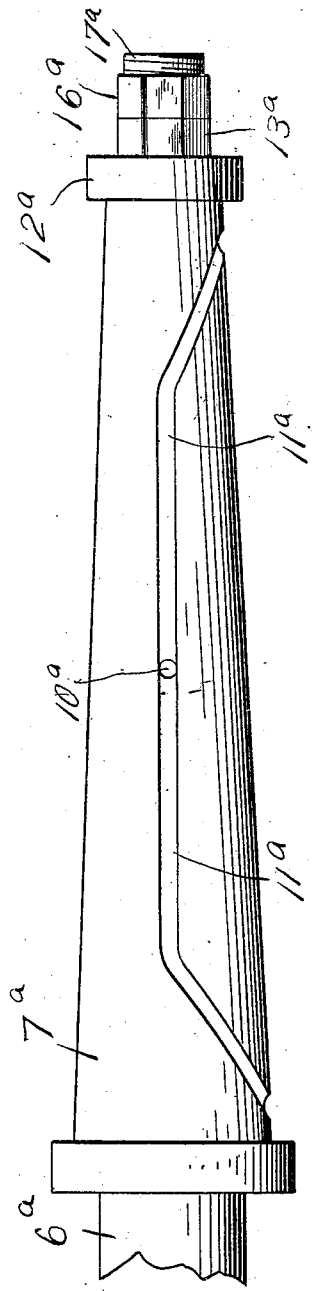
Witnesses
J. C. Simpson.
H. G. Smith.
Inventor
Earl W. Hanna
By Chandler & Chandler
Attorneys

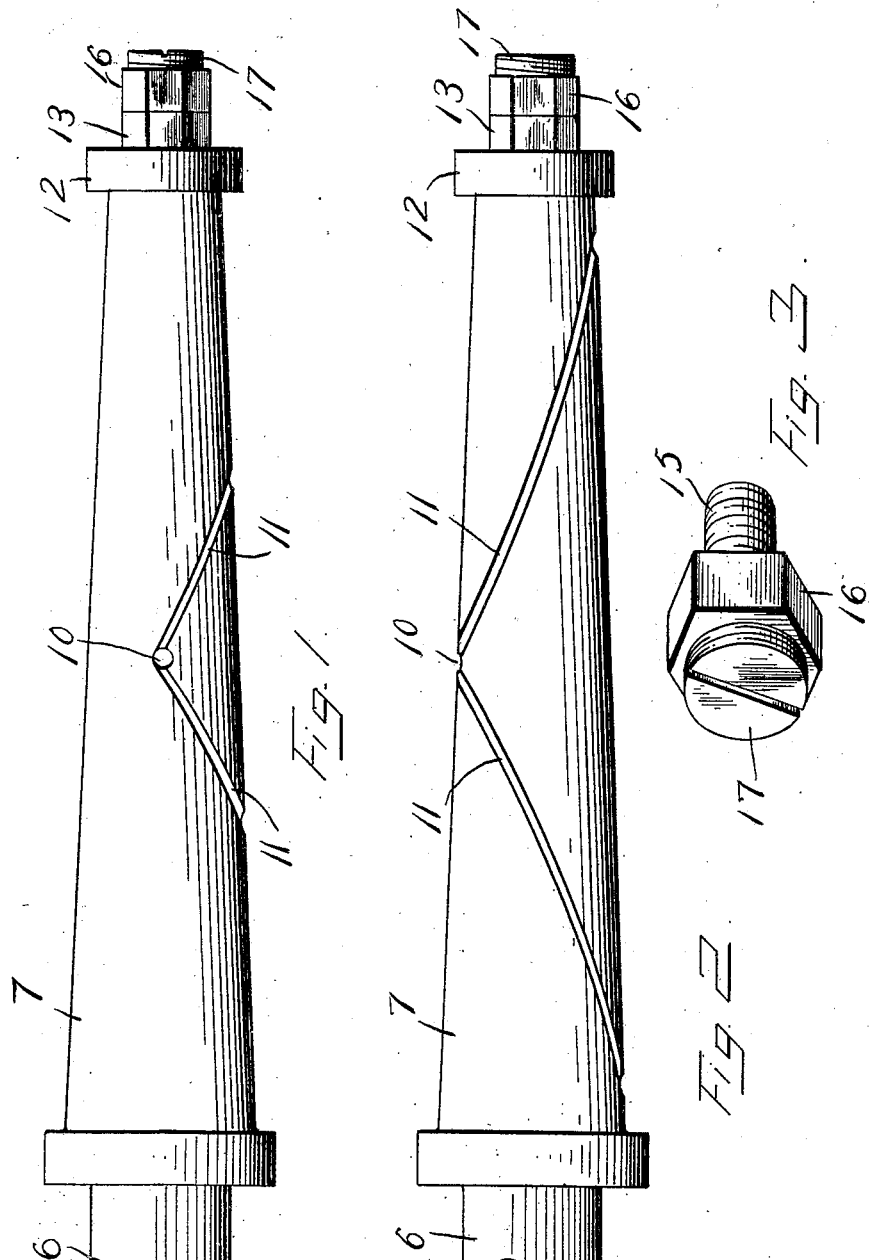

UNITED STATES PATENT OFFICE.

EARL W. HANNA, OF MILLEDGEVILLE, ILLINOIS.

SELF-LUBRICATING AXLE-SPINDLE.

No. 920,736.      Specification of Letters Patent.      Patented May 4, 1909.

Application filed January 31, 1908. Serial No. 413,674.

*To all whom it may concern:*

Be it known that I, EARL W. HANNA, a citizen of the United States, residing at Milledgeville, in the county of Carroll, State of Illinois, have invented certain new and useful Improvements in Self-Lubricating Axle-Spindles; and I do hereby declare the following to be a full, clear, and exact description of the invention, such as will enable others skilled in the art to which it appertains to make and use the same.

This invention relates to axle spindles and more particularly to a novel and desirable form of spindle of the self-lubricating class.

In carrying out my invention I have in view the provision, primarily, of an axle spindle of such construction that lubricant will be continuously, thoroughly and evenly fed to its surface. I attain this result by forming in the spindle a bore in the end of which is threaded the stem of a lubricant feed cup from which lubricant is fed to the bore. This bore is in communication with a channel which is formed in the surface of the axle spindle.

In the accompanying drawings, Figure 1 is a top plan view of a vehicle axle, the spindles of which are constructed in accordance with my invention, Fig. 2 is a side elevation thereof, Fig. 3 is a detail perspective view of the lubricant feeder, Fig. 4 is a vertical longitudinal sectional view through the spindle, and, Fig. 5 is an elevation showing a different form of lubricant feed-groove in the spindle.

In the first four figures of the drawings illustrating the preferred form of my invention, the axle is indicated by the numeral 6 and one of its spindles by the numeral 7. The outer end of the spindle 7 is reduced and threaded as at 8, and formed axially of the spindle and opening at one of its ends through the extreme outer end thereof is a bore 9, the other end of the bore being directed upwardly as at 10 and opening through the upper side of the spindle. This latter end of the bore communicates with or opens into a groove 11 which is formed in the periphery of the spindle and which extends spirally around the same.

A nut 12 is formed with an extension 13, and this nut is threaded upon the reduced threaded end 8 of the said spindle, it, as well as its extension, being formed with a threaded bore 14, that portion of the bore 14 which extends through the extension being designed for the reception of the threaded neck 15 of a lubricant feeder. This feeder is comprised of a section 16 with which the neck 15 is formed integral, and with a follower section 17 which is threaded into the section 16 and may be turned to force the lubricant therefrom and through the bore 9 and into the grooves or oil ways 11.

It will be understood from the foregoing description of this form of my invention that oil, axle grease, or any other lubricant may be placed in the lubricant feeder and the section 17 thereof screwed to a greater or less degree into the other section 16 the lubricant thus being forced to the bore 9 and by way of this bore into the grooves 11.

In the form of my invention illustrated in Fig. 5, elements corresponding to those of the first four figures are indicated by the same reference characters with the addition of the suffix *a* and in this form of the invention, the groove 11$^a$ is extended longitudinally of the spindle and has its end portions turned to extend in a spiral direction around the said spindle.

What is claimed, is:—

In an axle-lubricator, the combination with an axle-spindle having a reduced threaded outer end and a longitudinal bore communicating at one end with the surface of the spindle and at the other end with the outer end of the reduced portion thereof, a nut screwed on the reduced portion of the spindle and having an extension, a lubricant reservoir screwed into the extension and communicating with the bore of the spindle, and a follower working in the reservoir.

In testimony whereof, I affix my signature, in presence of two witnesses.

EARL W. HANNA.

Witnesses:
     GEO. W. HANNA,
     J. E. MILLER.